(No Model.)

J. DELLINGER.
LEAD TRAP.

No. 473,062.  Patented Apr. 19, 1892.

Witnesses.
J. M. Caldwell,
Charles Schenk.

John Dellinger, Inventor.
By James Sangster,
Attorney.

UNITED STATES PATENT OFFICE.

JOHN DELLINGER, OF BUFFALO, NEW YORK.

LEAD TRAP.

SPECIFICATION forming part of Letters Patent No. 473,062, dated April 19, 1892.

Application filed December 16, 1891. Serial No. 415,273. (No model.)

*To all whom it may concern:*

Be it known that I, JOHN DELLINGER, a citizen of the United States, residing at Buffalo, in the county of Erie and State of New York, have invented certain new and useful Improvements in Lead Traps, of which the following is a specification.

My invention relates to certain improvements in plumbers' traps for sinks, basins, or any purpose where a trap is required, and will be fully and clearly hereinafter described and claimed, reference being had to the accompanying drawings, in which—

Figure 1:
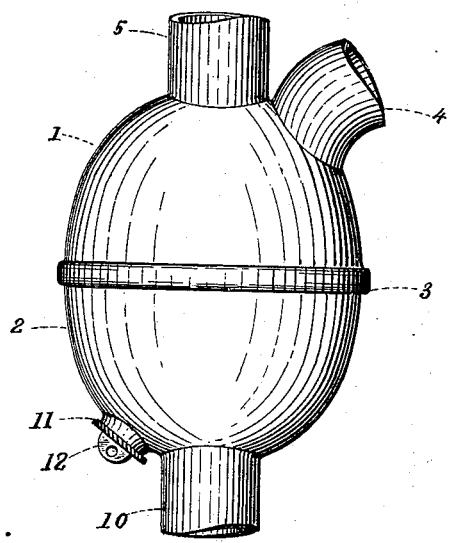
Figure 2:
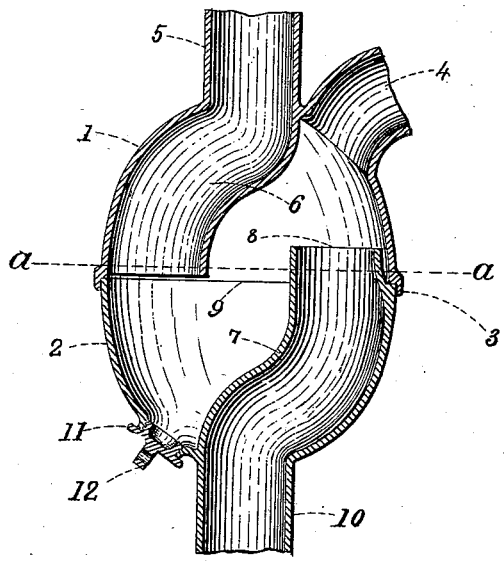
Figure 3:
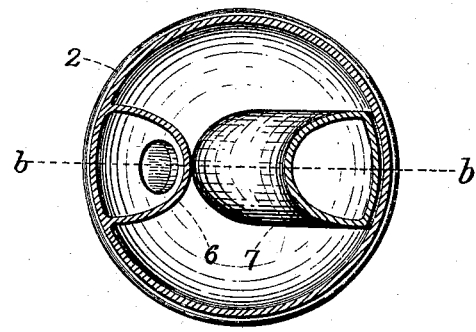

Figure 1 is a side elevation of the trap complete. Fig. 2 is a vertical central section on or about line $b\,b$, Fig. 3. Fig. 3 is a horizontal section on or about line $a\,a$, Fig. 2.

Referring to the drawings, this trap is generally made of lead; but any suitable material may be used. It is constructed of two parts 1 and 2, soldered or otherwise secured together in any well-known way at the point 3. The portion 1 is provided with a vent-pipe 4 and a flue or passage, which commences with a vertical central pipe 5, located in the top center of the portion 1 and extending down in a curved flue 6 (in Fig. 2) nearly to the bottom of the said portion 1, which forms one side of the flue 6. The lower edge of this portion 1 is also provided with a surrounding flange 3, adapted to receive the edge of the lower connecting portion 2. The lower portion 2 is also provided with a side flue 7, which extends down in a curved line. One side of this flue is formed by the side of the case 2. The upper part of the flue 7 terminates in a tubular portion 8, which extends up a short distance above the edge 9 of the portion 2. (See Fig. 2.) The lower end of the flue 7 terminates in a tube or pipe 10, which extends downward in the center of the part 2, so as to be exactly in a line with the pipe 5. At or near the bottom of the lower part 2 is a screw-plug or stopper 11, which can be removed to clean the trap at any time when required.

The object in having the upper and lower pipes 5 and 10 exactly in a line with each other is to permit the trap to be put up in any convenient position, so that the outlet-pipe 4 can be connected with a pipe at any desired point or at any point said pipe may be located. The lower portion 2, with its side flue 7, is also formed in one piece and is adapted to be connected to the portion 1, as hereinbefore mentioned.

The screw-plug or stopper 11 is provided with a small flat portion 12, by which it may be turned in or out.

The object in making the tubular portion or pipe 8 extend above the edge of the case 2 is to allow the level of the water to rise high enough to seal the trap.

I claim as my invention—

A lead trap consisting of an upper portion 1, having a flue extending up from a point above the bottom edge along the side of the case of which it forms a part and terminating in a pipe projecting vertically upward through the top of the portion 1 and provided with a vent-pipe, in combination with a lower portion 2, having a flue extending down in a curved line along the side of the case of which it forms a part and terminating in a central pipe extending in a line with the upper vertical pipe, the upper end of the lower flue terminating in a short pipe which projects slightly above the upper edge of the portion 2, for the purposes described.

JOHN DELLINGER.

Witnesses:
JAMES SANGSTER,
J. M. CALDWELL.